US012810752B2

(12) United States Patent
Nakamura

(10) Patent No.: US 12,810,752 B2
(45) Date of Patent: Nov. 24, 2026

(54) DIGITAL SIGNAGE DEVICE, CONTENT PRESENTATION METHOD, AND PROGRAM

(71) Applicant: Sharp Kabushiki Kaisha, Sakai City (JP)

(72) Inventor: Keisuke Nakamura, Tokyo (JP)

(73) Assignee: SHARP KABUSKI KAISHA, Sakai City (JP)

( * ) Notice: Subject to any disclaimer, the term of this patent is extended or adjusted under 35 U.S.C. 154(b) by 0 days.

(21) Appl. No.: 19/288,517

(22) Filed: Aug. 1, 2025

(65) Prior Publication Data

US 2025/0356781 A1 Nov. 20, 2025

Related U.S. Application Data

(63) Continuation of application No. PCT/JP2023/004215, filed on Feb. 8, 2023.

(51) Int. Cl.
*G09F 9/30* (2006.01)
*B60L 58/12* (2019.01)

(52) U.S. Cl.
CPC ................ *G09F 9/30* (2013.01); *B60L 58/12* (2019.02)

(58) Field of Classification Search
CPC .... B60L 58/12; G06Q 30/0241; G06Q 50/10; G09F 9/30
See application file for complete search history.

(56) References Cited

U.S. PATENT DOCUMENTS

2019/0126767 A1 5/2019 Sakuma et al.
2021/0162880 A1 * 6/2021 Sakuma .................. B60L 53/60

FOREIGN PATENT DOCUMENTS

JP 2012-182872 A 9/2012
JP 2019-082415 A 5/2019
WO 2022/244606 A1 11/2022

OTHER PUBLICATIONS

International Search Report dated Apr. 18, 2023 in International Patent Application No. PCT/JP2023/004215 with machine English translation.

* cited by examiner

*Primary Examiner* — Stacy Khoo
(74) *Attorney, Agent, or Firm* — MCGINN INTELLECTUAL PROPERTY LAW GROUP, PLLC

(57) ABSTRACT

A content management unit acquires a waiting time when a user waits to charge an in-vehicle battery, extracts candidate facilities available to the user in accordance with the acquired waiting time. The content management unit acquires surrounding environment information indicating an environment around the facility for charging the in-vehicle battery. The content management unit selects at least one candidate facility from the candidate facilities in accordance with the acquired surrounding environment information. The content management unit identifies presentation content related to the selected candidate facility. A display processing unit displays the presentation content identified by the content management unit.

4 Claims, 11 Drawing Sheets

FIG. 6

| CONTENT NAME | PROVIDING LOCATION (COORDINATES) | TAG | TRAVEL TIME (ROUND TRIP) | STAY TIME | REQUIRED TIME (TOTAL) |
|---|---|---|---|---|---|
| PARK A | 30° 21' 4" N, 145° 48' 9" E | SIGHTSEEING, PARK, FISHING, AND DOG RUN | 2MIN | 12MIN | 14MIN |
| CAFE B | 30° 21' 3" N, 145° 53' 5" E | MEALS, FREE WI-FI, AND COUNTER SEAT | 4MIN | 15MIN | 19MIN |
| RESTAURANT C | 30° 21' 0" N, 145° 57' 9" E | MEALS, DINNER, AND FAMILY-FRIENDLY | 6MIN | 15MIN | 21MIN |
| TOURIST ATTRACTIONS D | 30° 21' 2" N, 145° 52' 1" E | SIGHTSEEING, HISTORY, CASTLE, AND NATURE | 6MIN | 20MIN | 26MIN |
| SHRINE E | 30° 21' 3" N, 145° 53' 3" E | SIGHTSEEING, SHRINE, AND POWER SPOT | 8MIN | 18MIN | 26MIN |
| SOBA RESTAURANT F | 30° 21' 5" N, 145° 58' 8" E | MEALS, LUNCH, AND PRIVATE MANAGEMENT | 10MIN | 32MIN | 42MIN |
| AQUARIUM G | 30° 21' 1" N, 145° 50' 1" E | SIGHTSEEING, AQUARIUM, AND EVENT | 6MIN | 45MIN | 51MIN |
| ZOO H | 30° 21' 4" N, 145° 47' 1" E | SIGHTSEEING, ZOO, AND KID-FRIENDLY | 10MIN | 50MIN | 60MIN |
| MUSEUM I | 30° 21' 3" N, 145° 55' 7" E | SIGHTSEEING, MUSEUM, AND SCIENCE | 12MIN | 60MIN | 72MIN |

DIGITAL SIGNAGE DEVICE, CONTENT PRESENTATION METHOD, AND PROGRAM

TECHNICAL FIELD

The present invention relates to a digital signage device, a content presentation method, and a program.

BACKGROUND ART

In recent years, various companies have released electric vehicles. However, compared to conventional gasoline-powered vehicles and hybrid vehicles, electric vehicles have not yet become widespread. One of the reasons for this is that a process of charging an electric vehicle is time-consuming. There are generally two types of charging methods for electric vehicles, i.e., "normal charging" and "fast charging." The time required for charging is, for example, six or more hours for normal charging and approximately 30 minutes for fast charging. On the other hand, the time required to refuel a gasoline-powered vehicle is approximately five minutes. In other words, the longer time required to refuel compared to a gasoline-powered vehicle can be said to be a disadvantage of an electric vehicle. As a result of the long time required for charging, improving the current situation in which users are forced to wait for a long time is a challenge for popularizing electric vehicles. Patent Document 1 describes technology for extracting information about available facilities in accordance with the time required for charging. Patent Document 2 describes technology for distributing advertisements for nearby facilities corresponding to charging facilities.

CITATION LIST

Patent Document

Patent Document 1: Japanese Unexamined Patent Application, First Publication No. 2012-182872

Patent Document 2: Japanese Unexamined Patent Application, First Publication No. 2019-82415

SUMMARY OF INVENTION

Technical Problem

However, a situation of the facility changes from moment to moment. For example, depending on a congestion situation of a commercial facility such as a restaurant, it may be difficult for users to use the facility for a waiting time during charging and the waiting time may not be used effectively.

In consideration of the above-mentioned problems, an objective of the present invention is to provide a digital signage device, a content presentation method, and a program that can present content in accordance with changes in a situation.

Solution to Problem

According to an aspect of the present invention, there is provided a digital signage device including: a content management unit configured to acquire a waiting time when a user waits to charge an in-vehicle battery, extract candidate facilities available to the user in accordance with the acquired waiting time, acquire surrounding environment information indicating an environment around the facility for charging the in-vehicle battery, select at least one candidate facility from the candidate facilities in accordance with the acquired surrounding environment information, and identify presentation content related to the selected candidate facility; and a display processing unit configured to display the presentation content identified by the content management unit.

Moreover, according to an aspect of the present invention, there is provided a content presentation method to be performed by a computer that is a digital signage device, the content presentation method including: acquiring, by a content management unit, a waiting time when a user waits to charge an in-vehicle battery, extracting candidate facilities available to the user in accordance with the acquired waiting time, acquiring surrounding environment information indicating an environment around the facility for charging the in-vehicle battery, selecting at least one candidate facility from the candidate facilities in accordance with the acquired surrounding environment information, and identifying presentation content related to the selected candidate facility; and displaying, by a display processing unit, the presentation content identified by the content management unit.

Moreover, according to an aspect of the present invention, there is provided a program for causing a computer, which is a digital signage device, to: acquire a waiting time when a user waits to charge an in-vehicle battery; extract candidate facilities available to the user in accordance with the acquired waiting time; acquire surrounding environment information indicating an environment around the facility for charging the in-vehicle battery; select at least one candidate facility from the candidate facilities in accordance with the acquired surrounding environment information and identify presentation content related to the selected candidate facility; and display the presentation content.

Advantageous Effects of Invention

According to the present invention, content can be presented in accordance with a change in a situation. Thus, a user can effectively use a waiting time during charging.

BRIEF DESCRIPTION OF DRAWINGS

FIG. 6 An explanatory diagram of a process performed by the digital signage device.

DESCRIPTION OF EMBODIMENTS

Hereinafter, embodiments of the present invention will be described.

Figure 1:
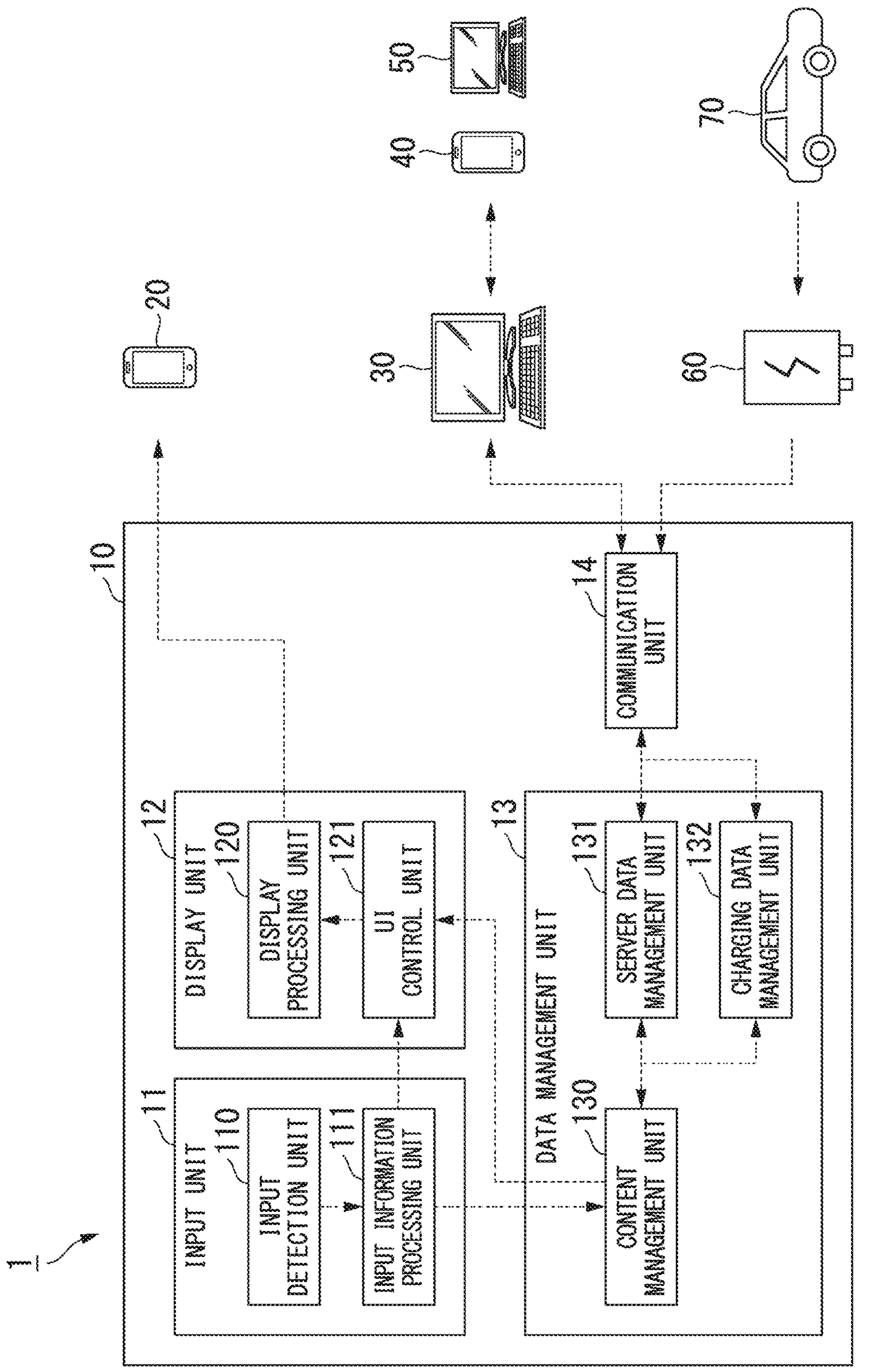
FIG. 1 A block diagram showing a configuration of a content providing system in an embodiment of the present invention.

FIG. 1 is an explanatory block diagram of a configuration of a content providing system 1 in an embodiment of the present invention. The content providing system 1 is a system that provides information (content) about facilities available to users according to a waiting time during charging.

For example, the content providing system 1 includes a digital signage device 10, a user terminal 20, a server computer 30, a server manager terminal 40, a content provider terminal 50, a charging device 60, and an electric vehicle 70.

The digital signage device 10 is a computer that displays information (content) about facilities. The digital signage device 10 is connected to each of the user terminal 20, the server computer 30, and the charging device 60 by wired or wireless communication via a network or the like.

The user terminal 20 is a computer used by a user. The user here is a user who uses the information displayed on the digital signage device 10. The user terminal 20 is, for example, a smartphone, a tablet terminal, a wearable terminal, or the like.

The server computer 30 is a computer that stores a group of content to be displayed on the digital signage device 10. The server computer 30 is connected to each of the server manager terminal 40 and the content provider terminal 50 by wired or wireless communication via a network or the like. The server manager terminal 40 is a terminal device used by a manager who manages the server computer 30. The server manager terminal 40 is, for example, a PC, a smartphone, a tablet terminal, or the like. The content provider terminal 50 is a terminal device used by a provider who provides content. The content provider terminal 50 is, for example, a PC, a smartphone, a tablet terminal, or the like.

The charging device 60 is a device that charges a battery mounted on the electric vehicle 70. The electric vehicle 70 is an electric vehicle that charges its own battery using the charging device 60. The charging device 60 is electrically connected to the electric vehicle 70 in a wired or wireless manner via a charging cable or the like. Moreover, the charging device 60 also transmits and receives control signals for charging the battery by establishing a communication connection to the electric vehicle 70 in a wired or wireless manner via a network or the like.

When the charging device 60 is connected to the electric vehicle 70 via a charging cable or the like, information necessary to calculate the charging time, which is the time required for charging, is acquired from the electric vehicle 70. The information necessary to calculate the charging time here is, for example, information indicating a type of battery, an amount of power with which the battery is charged, a model of the electric vehicle 70, and the like. The charging device 60 transmits the information acquired from the electric vehicle 70 to the digital signage device 10. Moreover, the charging device 60 transmits information about charging performance of the charging device 60, for example, information indicating a charging output (a charging speed), to the digital signage device 10 as information necessary to calculate the charging time.

The digital signage device 10, for example, calculates the charging time required for the battery to be fully charged on the basis of the information received from the charging device 60, i.e., the information required to calculate the charging time. Here, any conventional algorithm may be employed as an algorithm for calculating the charging time. The digital signage device 10 designates the calculated charging time as the user's waiting time.

The digital signage device 10 selects content that the user can experience during the time until the waiting time expires on the basis of the waiting time and displays the selected content. For example, the digital signage device 10 uses a database (see FIG. 6) to select content that the user can use during the waiting time. The database here stores attribute information about each facility located in the vicinity of an installation location of the charging device 60. The attribute information here is information indicating a feature of the facility and is, for example, information indicating a travel time required to reach the facility, a stay time, or the like. The attribute information here is information indicating a feature of the facility. For example, the attribute information is information indicating a standard travel time required to reach the facility (a standard travel time which is hereinafter also simply referred to as a travel time). Moreover, the attribute information is information indicating a standard stay time (a reference stay time which hereinafter also simply referred to as a stay time). In addition, the database may be stored in the digital signage device 10, the server computer 30, or an external device different from the digital signage device 10 and the server computer 30.

The digital signage device 10 uses the database to select, for example, a facility in which a required time, which is a sum of the travel time to and from the facility and the stay time, is less than the waiting time, as content that the user can experience.

For example, if the waiting time is 30 minutes, content of shopping, a takeout service, and the like having a required time estimated to be less than or equal to the waiting time (30 minutes) is displayed on the digital signage device 10. For example, content of a souvenir store, a fast-food restaurant, and the like which can offer a takeout and in which the stay time is estimated to be less than or equal to approximately 20 minutes as facilities located at a location approximately a three-minute walk from an installation location of the charging device 60 is displayed on the digital signage device 10. Alternatively, content of a restaurant delivery service and the like estimated to be able to provide a delivery service for a local area (a location where the charging device 60 is installed) within approximately 10 minutes from ordering is displayed on the digital signage device 10.

For example, if the waiting time is one hour, content of meals, sightseeing, and the like having the required time estimated to be less than or equal to the waiting time (one hour) may be displayed on the digital signage device 10. For example, content of restaurants, museums, large commercial facilities, tourist attractions, and the like, which are located within approximately a five-minute walk from the installation location of the charging device 60 and in which the stay time is estimated to be less than or equal to approximately 40 minutes, is displayed on the digital signage device 10.

For example, when the waiting time is six hours, content of leisure facilities, accommodation facilities, and the like having the required time estimated to be long and to be less than or equal to the waiting time (six hours) may be displayed on the digital signage device 10. For example, content of leisure facilities, accommodation facilities, and the like located within approximately a five-minute walk from the installation location of the charging device 60 may be displayed on the digital signage device 10.

Although the case where content related to a facility within a walking distance from the installation location of the charging device 60 is displayed has been described as an example, the present invention is not limited thereto. It is only necessary for the facility to be at least estimated to be available to the user during the waiting time. The facility does not have to be within walking distance from the installation location of the charging device 60. For example, if the facility is accessible by a vehicle such as a shuttle bus, content related to the facility located at a location approximately five minutes away by car from the installation location of the charging device 60 may be displayed on the digital signage device 10.

Although the case where the digital signage device 10 calculates the waiting time on the basis of the information received from the charging device 60 has been described above as an example, the present invention is not limited thereto. The digital signage device 10 may acquire the waiting time in a manipulation input process of the user or the like. Thereby, for example, even if the digital signage device 10 and the charging device 60 are not communicatively connected to each other, the digital signage device 10 can acquire the waiting time. Moreover, it is possible to acquire the waiting time expected by the user in cases where the user wants to interrupt charging when the battery is charged to a certain extent without waiting for the battery to be fully charged and the like.

Although the case where the content is displayed on the digital signage device 10 has been described as an example, the present invention is not limited thereto. The content may be displayed on the user terminal 20. For example, in the content providing system 1, an application for presenting the content is provided. The application here may be provided by a web browser or may be provided by being installed on a terminal such as the user terminal 20. The user terminal 20 accesses a URL for providing the application or installs the application. Thereby, it is possible to display the content on the user terminal 20.

As shown in FIG. 1, the digital signage device 10 has, for example, an input unit 11, a display unit 12, a data management unit 13, and a communication unit 14.

The input unit 11 receives a manipulation from a user and outputs information according to the received manipulation. The input unit 11 has, for example, an input detection unit 110 and an input information processing unit 111.

The input detection unit 110 detects a manipulation from the user. The input detection unit 110 includes an input device, for example, a touch screen, a manipulation button, and the like. When the user manipulates the input device, the input detection unit 110 acquires manipulation information corresponding to the manipulation. For example, when a touch manipulation is performed on the touch screen, the input detection unit 110 acquires manipulation information indicating that the touch manipulation has been performed on a specific location on the touch screen. The input detection unit 110 outputs the acquired manipulation information to the input information processing unit 111.

The input information processing unit 111 outputs the manipulation information to the display unit 12 and the data management unit 13. Alternatively, the input information processing unit 111 may output the manipulation information to one or both of the display unit 12 and the data management unit 13 in accordance with content of the manipulation indicated in the manipulation information. For example, when information indicating a waiting time during charging set by the user's input manipulation has been acquired as the manipulation information, the input information processing unit 111 outputs the information indicating the waiting time to the content management unit 130 of the data management unit 13. Thereby, the data management unit 13 selects content according to the waiting time. Alternatively, when information indicating a result of selecting an option displayed on the display unit 12 has been acquired as the manipulation information, the input information processing unit 111 outputs information indicating the selection result to the UI control unit 121 of the display unit 12. Thereby, an image according to the selection result is displayed by the display unit 12.

The display unit 12 displays content according to the control of the data management unit 13 and an image according to the user's manipulation. The display unit 12 has, for example, the display processing unit 120 and a UI control unit 121.

The display processing unit 120 displays an image. The display processing unit 120, for example, displays an image related to the content selected by the data management unit 13 in accordance with the control of the data management unit 13. Moreover, the display processing unit 120 displays an image according to manipulation information acquired by the input unit 11, for example, in accordance with the control of the UI control unit 121.

The UI control unit 121 controls a UI, i.e., the user interface. The UI control unit 121 provides the UI for the user to manipulate the content via the display processing unit 120.

Here, the UI for the user to manipulate the content will be described with reference to FIGS. 2 to 5. FIGS. 2 to 5 are explanatory diagrams of a process performed by the digital signage device 10.

Figure 2:
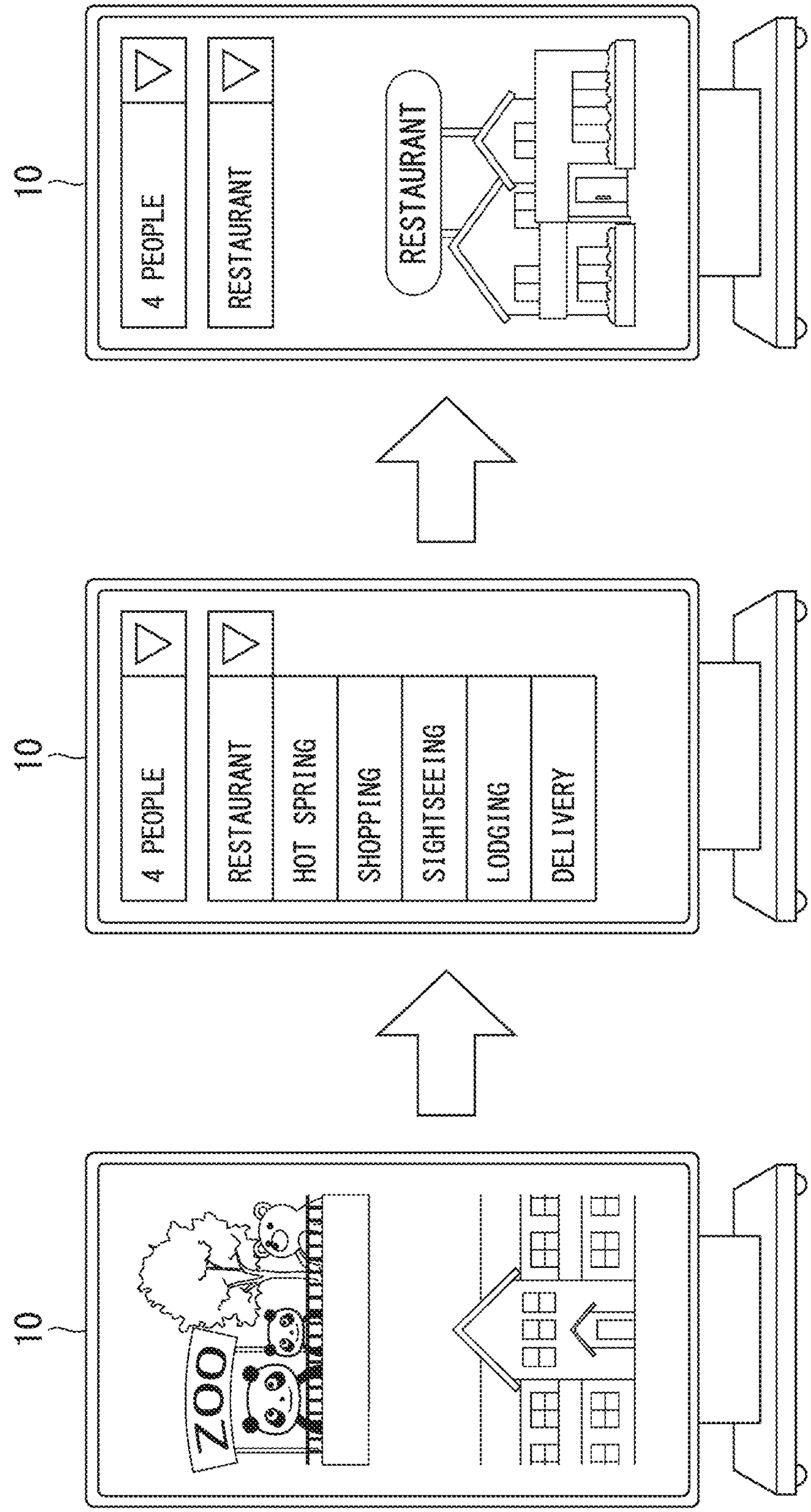
FIG. 2 An explanatory diagram of a process performed by a digital signage device.

In FIG. 2, the digital signage device 10 having the left side where content related to facilities such as a zoo and an art museum is displayed is schematically shown.

In response to such a content display, some users may not find content they want to use. For example, when content related to a family-friendly restaurant is displayed regardless of a state in which the user is alone and full, even if it is possible to use the restaurant for the waiting time during charging, the user will not feel like using the restaurant. On the other hand, when the user is with three tired and hungry children, even if content related to facilities such as a zoo and an art museum is displayed, the user will not feel like using these facilities. In this way, simply displaying content according to the waiting time does not necessarily result in the display of the content desired by the user.

In response to this, in the present embodiment, a UI is provided for narrowing down an amount of content according to the user's desires.

For example, as shown in the center of FIG. 2, the UI control unit 121 of the digital signage device 10 displays a UI for inputting the number of people using the facility and the purpose. For example, the UI control unit 121 displays a link associated with the description "narrowing down the amount of content" or "search for the content," or the like or an icon corresponding to the description and displays a UI shown in the center of FIG. 2 when the link or icon is touched by the user.

When the user inputs the number of people using the facility and the purpose according to the display of the UI shown in the center of FIG. 2, a notification of the input information is provided to the UI control unit 121 via the input unit 11. The UI control unit 121 outputs the acquired information, i.e., information indicating the number of users using the facility and the purpose, to the data management unit 13, and requests the data management unit 13 to select content satisfying conditions of the number of users and the purpose. The data management unit 13 selects content satisfying the conditions in response to the request from the UI control unit 121 and notifies the UI control unit 121 of the selected content. The UI control unit 121 causes the content selected by the data management unit 13 to be displayed.

On the right side of FIG. 2, an example of content selected according to the user's desires is shown. In FIG. 2, when the number of users is set to four and the purpose is set to meals (a restaurant), an example in which content related to a family-friendly restaurant is displayed as a facility satisfying the conditions is shown. Thereby, it is possible to display content that corresponds to the waiting time and also satisfies the user's wishes.

Figure 3:
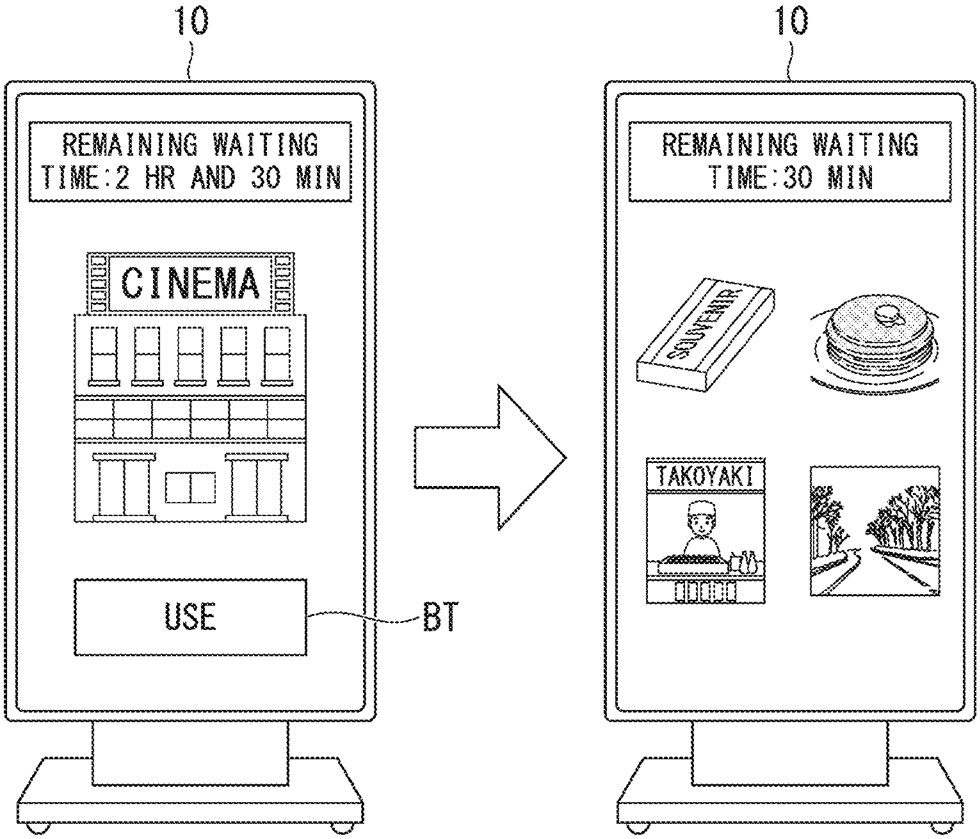
FIG. 3 An explanatory diagram of a process performed by the digital signage device.

On the left side of FIG. 3, an example in which a movie theater is selected as content that can be used during the waiting time (2 hours and 30 minutes) is shown.

In relation to such a content display, some content may only require a part of the waiting time (2 hours and 30 minutes) rather than the entire waiting time. For example, when a movie has a screening time of approximately 1 hour and 45 minutes, the required time in the movie theater is approximately 2 hours. In this case, even if a user uses a movie theater to watch a movie, approximately 30 minutes will be left over from the waiting time (2 hours and 30 minutes). In this case, if content that can be used during the required time of approximately the remaining 30 minutes or can be presented to the user, user convenience can be improved.

Therefore, in the present embodiment, a UI that allows the user to confirm the content that will actually be used is provided.

For example, as shown on the left side of FIG. 3, a selection button BT labeled "Use" is displayed below the displayed content. When the user touches the selection button BT, the digital signage device 10 is notified that the movie theater has been selected as the facility that the user will actually use.

For example, when the user touches the selection button BT labeled "Use," the UI control unit 121 of the digital signage device 10 changes the display to a selection button BT labeled "Cancel use." Alternatively, when the content displayed on the digital signage device 10 represents a facility that can be reserved, the UI control unit 121 may display a selection button BT labeled "Reserve" instead of the selection button BT labeled "Use." In this case, when the user touches the selection button BT labeled "Reserve," the UI control unit 121 changes the display to a selection button BT labeled "Cancel reservation."

In addition, in this case, when the user touches the selection button BT labeled "Reserve," the UI control unit 121 may display an image for making a reservation, such as a UI for inputting reservation details, the number of people included in a reservation, and a reservation time. Moreover, if there are coupons and tickets that can be used for the content selected by the user, a two-dimensional barcode for issuing the coupons and tickets and the like may be displayed.

Also, when the user touches the selection button BT labeled "Use" or "Reserve," the UI control unit 121 calculates the remaining waiting time. The UI control unit 121 calculates the remaining waiting time (30 minutes) by subtracting the required time (2 hours) in the facility that the user actually uses from the waiting time (2 hours and 30 minutes). The UI control unit 121 outputs the remaining waiting time to the data management unit 13 and requests the selection of content that can be used during the remaining waiting time. The data management unit 13 selects content in response to a request from the UI control unit 121 and notifies the UI control unit 121 of the selected content. The UI control unit 121 causes the content selected by the data management unit 13 to be displayed.

On the right side of FIG. 3, an example of the content selected according to the remaining waiting time is shown. In FIG. 3, an example in which content related to shopping for souvenirs, taking a break for a light meal or the like, walking in a park, and the like is displayed as content that can be used during the remaining waiting time (30 minutes) is shown. Thereby, it is possible to display content according to the remaining waiting time. Therefore, it is possible to suggest a suitable combination of a plurality of content items that can effectively use the waiting time as well as one content item to the user, thereby improving user convenience.

Figure 4:
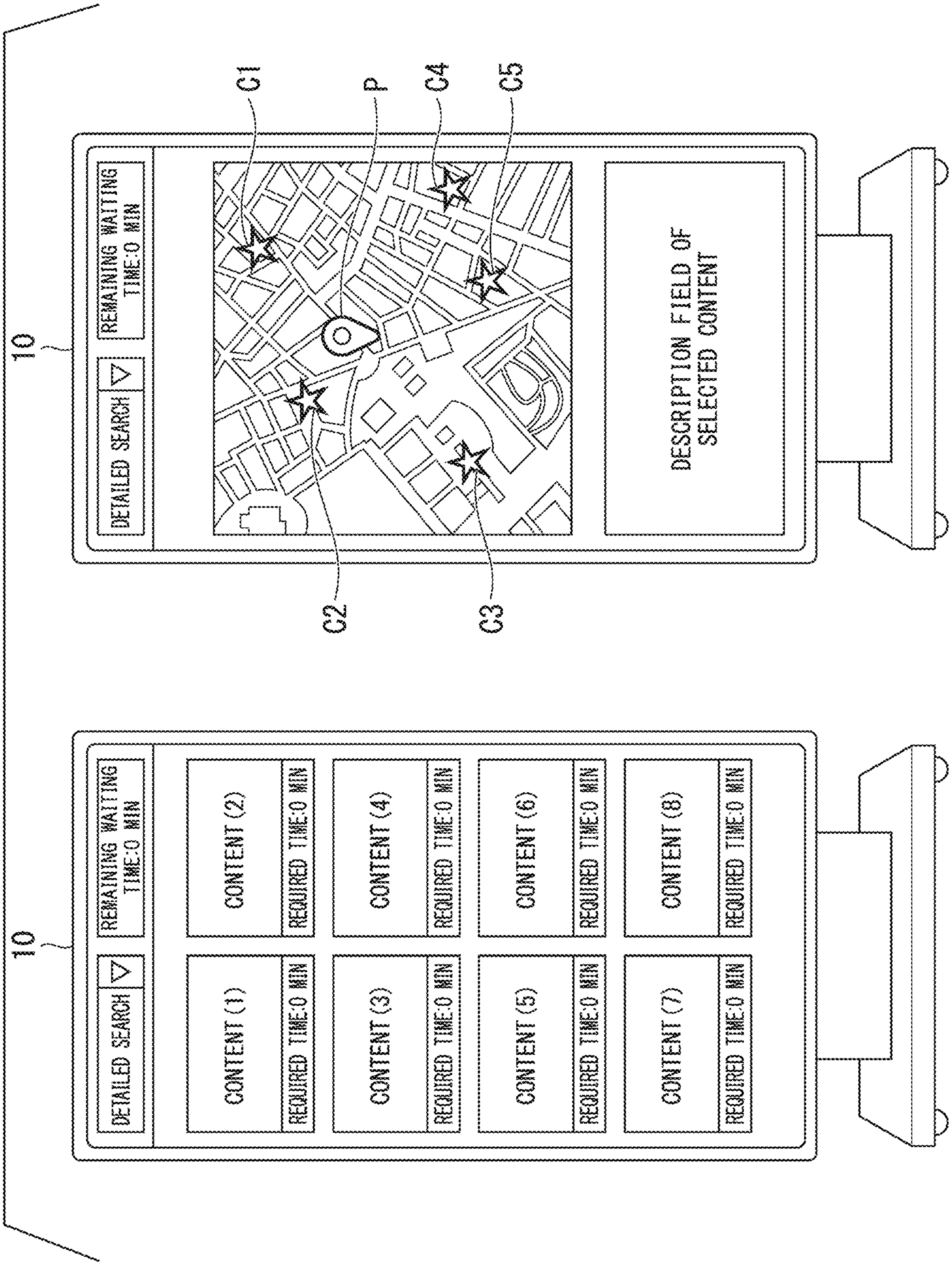
FIG. 4 An explanatory diagram of a process performed by the digital signage device.

In FIG. 4, the digital signage device 10 in which a plurality of content items are displayed in a list is schematically shown. In this way, a plurality of pieces items may be displayed in a list. Thereby, it becomes easier for the user to ascertain what type of content is available as content that can be used during the waiting time.

As an image for displaying a list of a plurality of content items, as shown on the left side of FIG. 4, there is a method of displaying the list by displaying each content item as a thumbnail or the like. Also, as shown on the right side of FIG. 4, there is a method of displaying the list by showing the location where each content item is provided on a map. In any list display case, when the user performs a manipulation for selecting content, the UI control unit 121 displays a screen showing details of the selected content.

Figure 5:
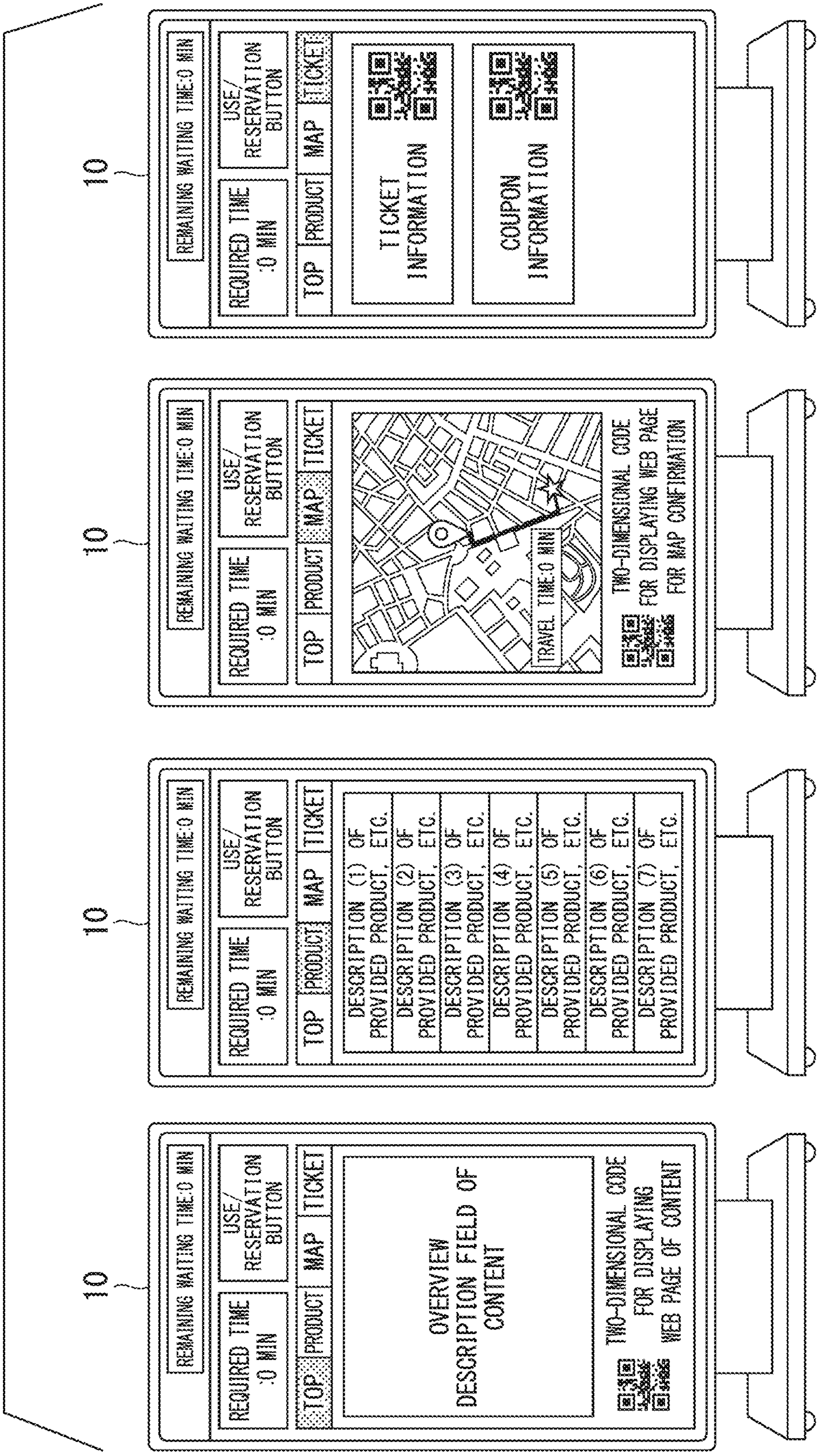
FIG. 5 An explanatory diagram of a process performed by the digital signage device.

In FIG. 5, a schematic diagram of the digital signage device 10 on which details of the content selected by the user are displayed is shown. In FIG. 5, an example in which four tabs corresponding to "Top," "Product," "Map," and "Ticket" are provided and detailed content corresponding to the selected tab is displayed when each tab is selected is shown.

In the leftmost part of FIG. 5, an example of the details of the content that are displayed when the tab labeled "Top" is selected is shown. When the tab labeled "Top" is selected, for example, an overview of the content is displayed. Also, when there is a web page for the content, a two-dimensional code for displaying the web page may be displayed.

In the second part from the left in FIG. 5, an example of content details that are displayed when the tab labeled "Product" is selected is shown. When the tab labeled "Product" is selected, for example, the description of the product or service provided in the content is displayed.

In the third part from the left in FIG. 5, an example of content details that are displayed when the tab labeled "Map" is selected is shown. When the tab labeled "Map" is selected, for example, a route from the current location to the location where the content is provided and a rough estimate of the travel time are displayed. Moreover, a two-dimensional code for displaying a link to a web page such as a map application to display the route from the current location to the location where the content is provided may be displayed on the user terminal 20.

In the rightmost part of FIG. 5, an example of content details that are displayed when the tab labeled "Ticket" is selected is shown. When the tab labeled "Ticket" is selected, for example, a two-dimensional code for displaying a link to a web page that issues a ticket is displayed. Moreover, a two-dimensional code for displaying a link to a web page that issues a coupon is displayed.

Returning to FIG. 1, the data management unit 13 manages the content to be displayed on the display unit 12. The data management unit 13 includes, for example, a content management unit 130, a server data management unit 131, and a charging data management unit 132.

The content management unit 130 selects content according to the waiting time. The content management unit 130 selects content that can be used during the waiting time in accordance with the waiting time provided in the notification from the charging device 60 or the input unit 11. The content management unit 130 selects content whose required time (a sum of a travel time and a stay time) is less than the waiting time. The content management unit 130 outputs information for displaying the selected content to the UI control unit 121.

Moreover, the content management unit 130 selects content according to a request from the UI control unit 121. For example, the content management unit 130 selects content that satisfies conditions set by the user, such as the number of users and the purpose, by referring to a database such as that shown in FIG. 6. Moreover, when the content that the user will actually use is confirmed, the content management unit 130 selects the content that can be used during the remaining waiting time by referring to the database on the basis of the remaining waiting time. The content management unit 130 outputs information for displaying the selected content to the UI control unit 121.

The server data management unit 131 manages a content group stored in the server computer 30. The server data management unit 131 manages the content group stored in the server computer 30 by generating a database such as that shown in FIG. 6, i.e., information in which each content item is associated with the travel time or the like from the installation location of the charging device 60 corresponding to the digital signage device 10.

For example, the server data management unit 131 manages each content item by linking the content item to the following information.

(1) Walking travel time (2) Stay time at content providing location (3) Content attributes (4) Content providing location As (1), the server data management unit 131 first calculates a distance from the installation location of the charging device 60 to the content providing location on the basis of location information about each location and the like. Moreover, the server data management unit 131 decides an average travel speed of the user by using big data such as a location information history of the portable terminal, and calculates an "average travel time" by dividing the distance by the travel speed. The server data management unit 131 sets the calculated "average travel time" as the walking travel time in (1).

As (2), the server data management unit 131, for example, decides the stay time on the basis of information provided from a content manager, i.e., the content provider terminal 50. As the information provided by the content provider terminal 50, information indicating the user's stay time estimated by the content manager, the average stay time measured using an indoor position information positioning system (e.g., a beacon or the like) and the like are considered. Alternatively, the server data management unit 131 may decide an average stay time of the user by using big data such as the history of location information of a portable terminal. The server data management unit 131 designates the decided stay time as the stay time at the content providing location (2).

As (3), the server data management unit 131 designates information indicating a feature of the content or the like as a content attribute. For example, it is desirable to set content according to the user's desired purpose such as meals, sightseeing, lodging, and shopping as content attributes. The server data management unit 131, for example, decides the content attribute from a keyword written on a web page corresponding to the content or a keyword indicating a feature of the content provided by the content manager and user. The server data management unit 131 may allow the server manager or the content manager to decide the content attribute. In this case, the server manager terminal 40 or the content provider terminal 50 transmits the content attribute to the digital signage device 10. The server data management unit 131 of the digital signage device 10 sets the content attribute provided in a notification from the server manager terminal 40 or the content provider terminal 50 as the content attribute of (3). Moreover, the server data management unit 131 may set suggested keywords displayed in a search engine or the like as the content attribute when the name of the content is set as a search keyword.

As (4), the server data management unit 131 designates location information that can be displayed on a map, such as Global Positioning System (GPS) coordinates, as information indicating the location where the content is provided.

Here, the database will be described with reference to FIG. 6. FIG. 6 is an explanatory diagram of a process performed by the digital signage device 10. In FIG. 6, an example of the database is shown.

As shown in FIG. 6, the database stores information corresponding to items such as a content name, a content providing location (coordinates), a tag, a travel time (round trip), a stay time, and a required time (total). The content name stores information indicating, for example, Park A, Cafe B, or the like as the name of the content. The content providing location (coordinates) stores information indicating the latitude and longitude, such as "30° 21'4"N, 145° 48'9"E," as the location where the content is provided. The tag stores information indicating a feature of the content, such as "sightseeing, park, fishing, and dog run," as the attribute of the content. In this way, a plurality of attributes may be associated with one content item. In the travel time (round trip), information indicating a standard round-trip travel time (reference travel time) from the installation location of the charging device 60 that the digital signage device 10 supports to the content providing location is stored. In the stay time, information indicating the standard stay time (reference stay time) in the content is stored. In the required time (total), information indicating the total time of the round-trip travel time and the stay time is stored.

Returning to FIG. 1, the charging data management unit 132 manages information required to calculate the charging time. The charging data management unit 132 calculates the charging time required for the battery to be fully charged on the basis of information of a notification from the charging device 60, for example, information indicating a type of battery of a charging destination, an amount of power with which the battery is charged, the model of the electric vehicle 70, and the like and a charging speed of the charging device 60. The charging data management unit 132 outputs the calculated charging time to the content management unit 130 as the waiting time of the user during charging.

The communication unit 14 communicates with the user terminal 20, the server computer 30, and the charging device 60.

Figure 7:
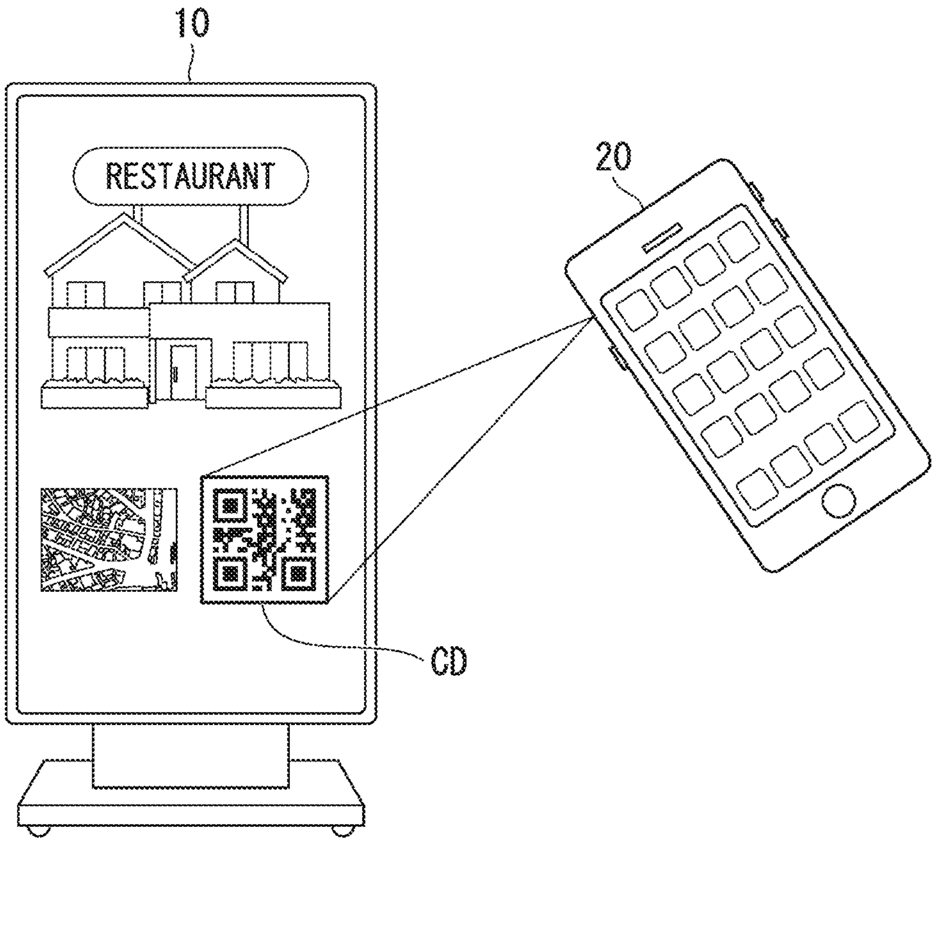
FIG. 7 An explanatory diagram of a process performed by the digital signage device.

Here, a method for providing information to the user via a two-dimensional code will be described with reference to FIG. 7. FIG. 7 is an explanatory diagram of a process performed by the digital signage device 10.

In FIG. 7, the digital signage device 10 on which a map and a two-dimensional code CD are displayed together with the content (here, a restaurant) used by the user is schematically shown. The two-dimensional code CD contains embedded information to be provided to the user, such as reservation details for the content, map data showing the route to the content providing location and the like, coupons or tickets that can be used in the content, a congestion situation and vacant seat information for the content, and the like.

The user reads the information embedded in the two-dimensional code CD by, for example, capturing an image of the two-dimensional code CD with the user terminal 20. Thereby, the user terminal 20 is allowed to display the reservation details of the content to be used by the user and the like.

Moreover, information indicating the current waiting time may also be embedded in the two-dimensional code CD. The current waiting time can be calculated by subtracting the time elapsed from the time when charging is started to a current time from the waiting time. For example, the digital signage device 10 calculates a current waiting time periodically or when the information embedded in the two-dimensional code CD is referred to by the user terminal 20 and displays a calculation result on the user terminal 20. Thereby, the user can ascertain how much time is left until charging is completed at any timing.

Moreover, information indicating a current charging situation may also be embedded in the two-dimensional code CD. The information indicating the current charging situation may be, for example, information indicating a distance that the electric vehicle 70 can move at the current time, or a current battery charging rate. For example, periodically or when the user terminal 20 refers to the information embedded in the two-dimensional code CD, the digital signage device 10 acquires information indicating the current charging situation from the charging device 60 and causes the user terminal 20 to display the acquired information. Thereby, the user can obtain information for determining a response such as whether to interrupt charging, for example, in a case where an unexpected event occurs or the like.

Moreover, information indicating the current surrounding environment may be embedded in the two-dimensional code CD. The surrounding environment here is a surrounding environment at the installation location of the charging device 60. Information indicating the surrounding environment may be, for example, information indicating the installation location of the charging device 60 or information indicating the weather and traffic congestion in an area around the installation location. Moreover, information indicating the usage situation of another charging device 60 in a nearby area may be included as information indicating the surrounding environment. For example, periodically or when the information embedded in the two-dimensional code CD is referred to by the user terminal 20, the digital signage device 10 acquires information indicating the current surrounding environment from the charging device 60 and displays the acquired information on the user terminal 20. Thereby, it is possible to consider a measure such as using another charging device 60 depending on the weather or traffic congestion situation.

Figure 8:
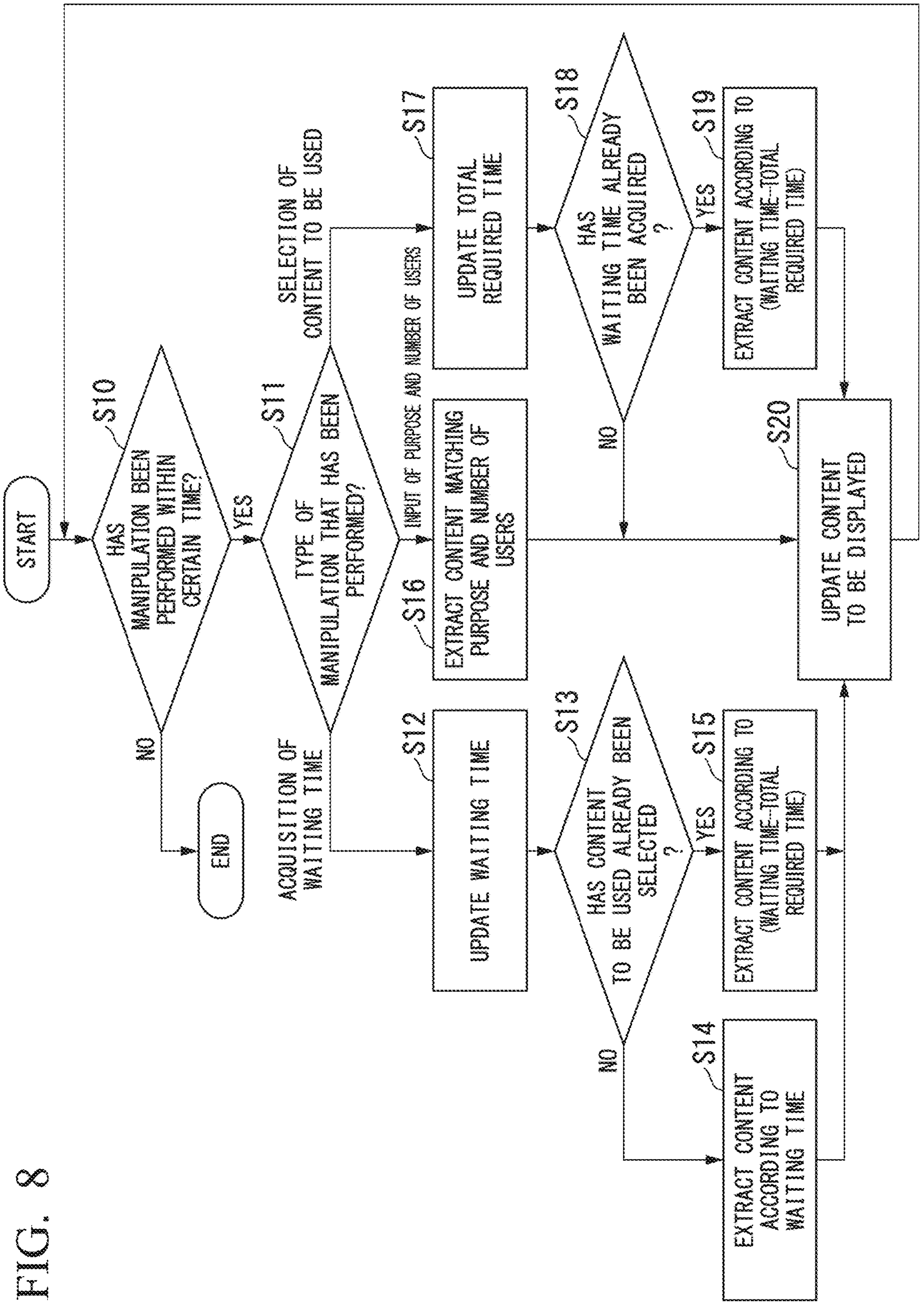
FIG. 8 A flowchart showing a flow of a process performed by the digital signage device.

Here, a flow of a process performed by the digital signage device 10 will be explained using FIG. 8. FIG. 8 is a flowchart showing the flow of the process performed by the digital signage device 10.

First, the digital signage device 10 determines whether or not a UI manipulation has been performed by the user within a certain period of time (step S10). When the user has not performed a UI manipulation, the process is ended. On the other hand, when the user has performed a UI manipulation, a type of UI manipulation that has been performed is determined. The type of UI manipulation here is any one of a manipulation for setting a waiting time, a manipulation for inputting a purpose and the number of users, and a manipulation for selecting content to be used.

When a manipulation for setting a waiting time has been performed in step S10, the digital signage device 10 updates the waiting time to the set waiting time in a case where the waiting time has already been stored (step S12). The digital signage device 10 determines whether or not content to be actually used by the user has already been selected (step S13). When content to be actually used by the user has not been selected, the digital signage device 10 selects the content to be displayed by extracting content that can be used during the waiting time (step S14). On the other hand, when content to be actually used by the user has already been selected, the digital signage device 10 calculates the remaining waiting time by subtracting the required time of the already selected content from the waiting time, and selects the content to be displayed by extracting the content according to the calculated remaining waiting time (step S15).

When a manipulation for inputting the purpose and the number of users has been performed in step S10, the digital signage device 10 selects the content to be displayed by extracting the content according to the purpose and the number of users (step S16).

When a manipulation for selecting the content to be used has been performed in step S10, the required time is updated to the required time of the selected content in a case where the required time has already been stored. When a plurality of content items have been selected, the digital signage device 10 calculates the total required time of each selected content item and updates the total required time to the calculated total required time (step S17).

Subsequently, the digital signage device 10 determines whether the waiting time has been acquired (step S18). The digital signage device 10 determines that the waiting time has been acquired when the digital signage device 10 has already acquired information for calculating the charging time from the charging device 60 or when the user has input the waiting time by manipulating the UI. On the other hand, when the digital signage device 10 has not acquired information for calculating the charging time from the charging device 60 and has not acquired the waiting time input by manipulating the UI, it is determined that the waiting time has not been acquired.

When the waiting time has not been acquired in step S18, the digital signage device 10 extracts an image for displaying that the user's manipulation has been received. For example, when the user has touched the selection button BT labeled "Use," the digital signage device 10 changes the display of the selection button BT to a display labeled "Stop Use." The digital signage device 10 selects the extracted image as the content to be displayed on the digital signage device 10.

When the waiting time has already been acquired in step S18, the digital signage device 10 calculates the remaining waiting time by subtracting the required time for the selected content from the waiting time and selects content to be displayed by extracting content corresponding to the calculated remaining waiting time (step S19).

The digital signage device 10 updates content extracted in any of steps S14, S15, S18, and S19 as content to be presented to the user (step S20).

Here, the situation of the facility related to the content changes from moment to moment. For example, it may be difficult for the user to use the facility for the waiting time during charging depending on the congestion of a commercial facility such as a restaurant and the waiting time may not be used effectively.

Figure 9:
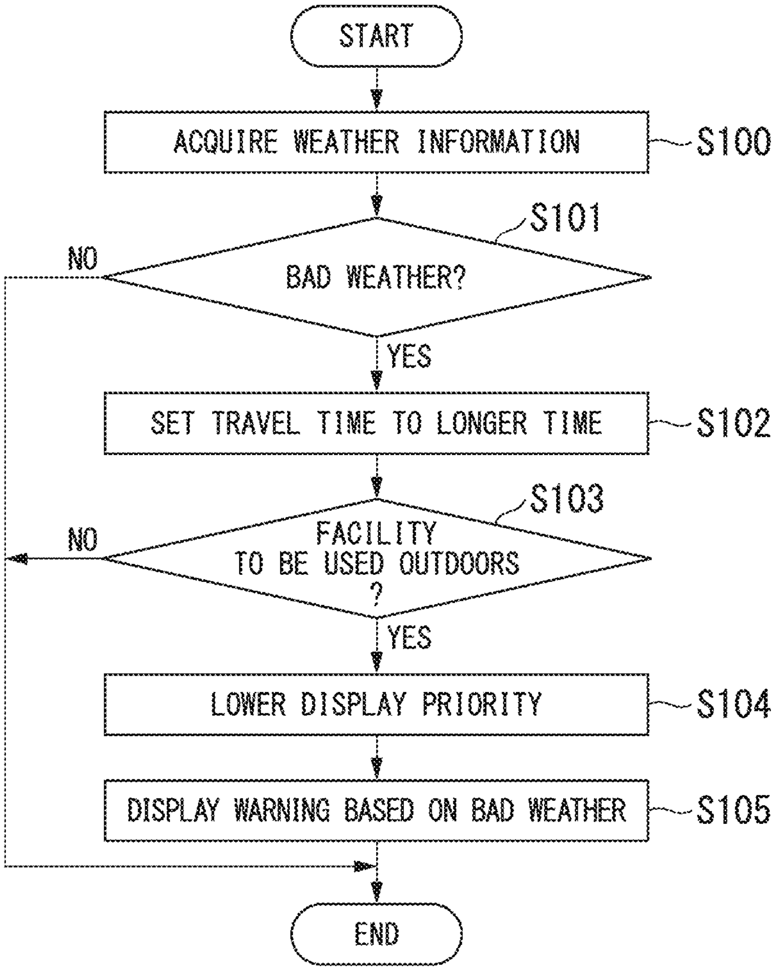
FIG. 9 A flowchart showing a flow of a process performed by the digital signage device.
Figure 10:
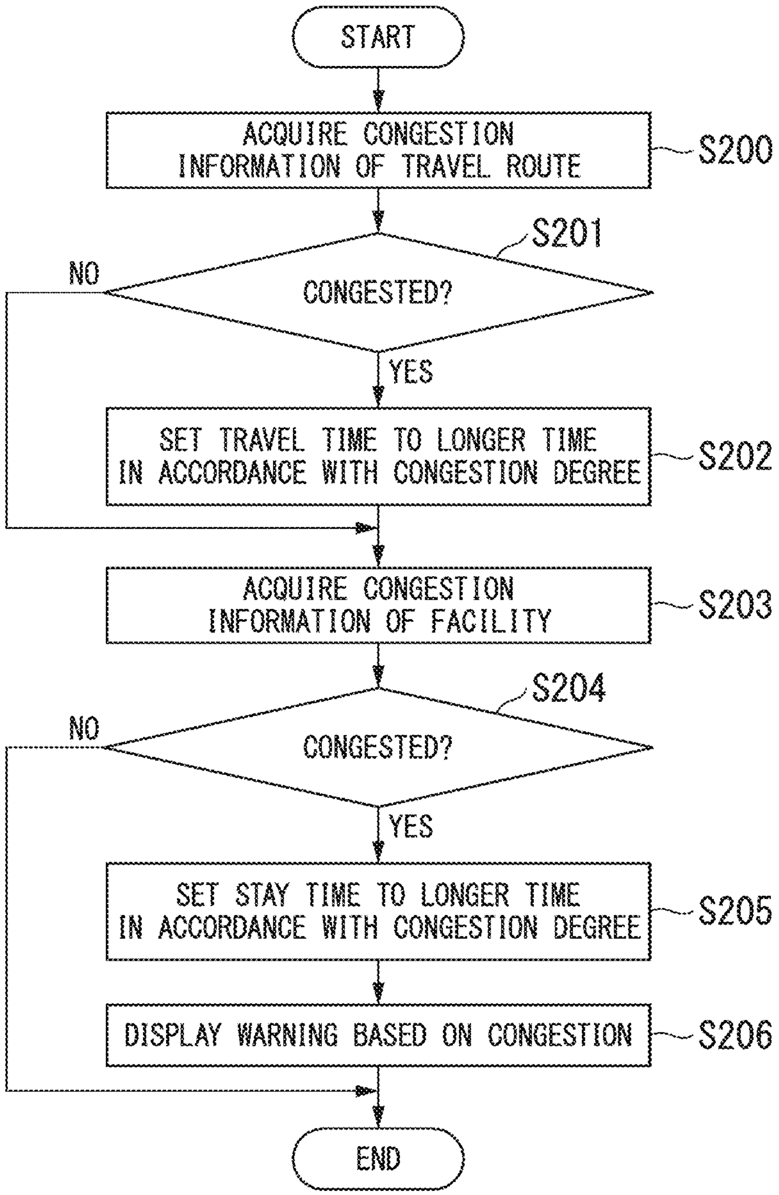
FIG. 10 A flowchart showing a flow of a process performed by the digital signage device.
Figure 11:
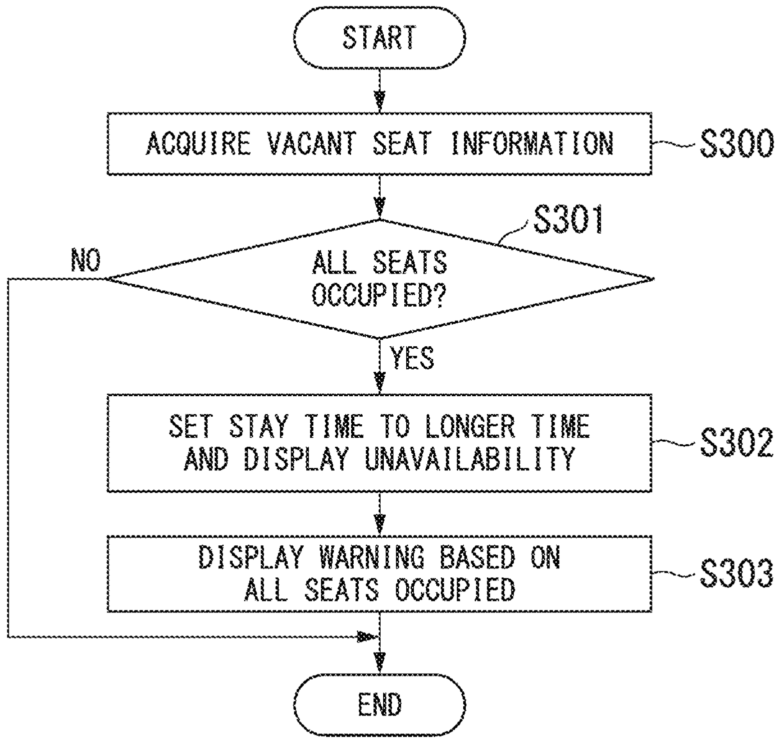
FIG. 11 A flowchart showing a flow of a process performed by the digital signage device.

Therefore, in the content providing system 1 of the present embodiment, the surrounding environment information indicating the current surrounding environment, i.e., the surrounding environment at the installation location of the charging device 60, is reflected in the display of the content. Hereinafter, the process in which the digital signage device 10 reflects information indicating the current surrounding environment in the display of the content will be described with reference to FIGS. 9 to 11. FIGS. 9 to 11 are flowcharts showing the flow of the process performed by the digital signage device.

In FIG. 9, a flow of a process in which weather information as surrounding environment information is reflected in the display of the content is shown. The weather information is information indicating the weather at the installation location of the charging device 60 at the current time or in the area near the installation location.

First, the digital signage device 10 acquires weather information (step S100). The digital signage device 10, for example, acquires weather information such as a current temperature by accessing a web page that provides weather information such as a temperature, wind speed, and precipitation.

Subsequently, the digital signage device 10 determines whether or not the weather is bad on the basis of the weather information (step S101). For example, if an amount of precipitation in the weather information is greater than or equal to a threshold value, the digital signage device 10 determines that it is raining and that the weather is bad. Moreover, when the wind speed in the weather information is greater than or equal to a threshold value, the digital signage device 10 may determine that a strong wind is blowing and that the weather is bad. Moreover, when the temperature in the weather information is greater than or equal to a threshold value, the digital signage device 10 may determine that it is extremely hot and that the weather is bad. Moreover, when the temperature in the weather information is less than the threshold value, the digital signage device 10 may determine that it is bitterly cold and that the weather is bad.

When it is determined that the weather is bad, the digital signage device 10 sets the travel time for the content so that the travel time is longer (step S102). For example, the digital signage device 10 lengthens the travel time by multiplying the standard travel time (the reference travel time) stored in the database by a coefficient of 1 or more (e.g., 1.5). Moreover, in this case, when it is determined that the weather is bad, the digital signage device 10 may set the stay time in the content so that the stay time is longer. For example, the digital signage device 10 lengthens the stay time by multiplying the standard stay time (the reference stay time) stored in the database by a coefficient of 1 or more (e.g., 1.5).

Moreover, when it is determined that the weather is bad, the digital signage device 10 determines whether or not the content is related to a facility to be used outdoors (an outdoor use facility) (step S103) and lowers the display priority of the content if the content is related to an outdoor use facility (step S104). The display priority here is the priority when the digital signage device 10 displays the content, and is, for example, the display priority when a plurality of content items are displayed in a list as shown in FIG. 4.

Moreover, when it is determined that the weather is bad and displays content related to the outdoor use facility, the digital signage device 10 displays a warning indicating that the weather is bad together with the content (step S105).

On the other hand, when it is determined that the weather is not bad in step S101 or when it is determined that the facility is not an outdoor use facility in step S103, the digital signage device 10 ends the process.

In FIG. 10, a flow of a process in which congestion information is reflected as surrounding environment information in the display of content is shown. The congestion information is information indicating a current congestion degree on a travel route to the content and information indicating a congestion degree in the facility corresponding to the content.

First, the digital signage device 10 acquires congestion information on the travel route (step S200). The digital signage device 10, for example, acquires congestion information about road congestion at the current time on the travel route and the like by accessing a web page of traffic accidents, road congestion, and the like.

Subsequently, the digital signage device 10 determines whether or not the travel route is congested on the basis of the congestion information of the travel route (step S201). For example, when the congestion information indicates that the route is congested, the digital signage device 10 determines that the travel route is congested.

When it is determined that the travel route is congested, the digital signage device 10 sets the travel time for the content so that the travel time is longer in accordance with the congestion degree (step S202). For example, the congestion information indicates the road congestion degree in four levels, i.e., "smooth," "slightly congested," "congested," and "very congested." In this case, the digital signage device 10 lengthens the travel time by multiplying the travel time stored in the database by one or more coefficients according to any of the four levels. For example, when the congestion information indicates that the congestion degree of the travel route is "smooth," the coefficient is 1.0. Moreover, in the case of "slightly congested," the coefficient is 1.2. Moreover, in the case of "congested," the coefficient is 1.5. Moreover, in the case of "very congested," the coefficient is 1.8. That is, when the congestion level indicated in the congestion information related to the travel route is greater than or equal to a threshold value, the digital signage device 10 changes the stay time in the candidate facility so that the stay time is longer than the reference stay time stored in the database. The threshold value here may be set arbitrarily.

Moreover. the digital signage device 10 acquires congestion information for the content (step S203). The digital signage device 10, for example, acquires a congestion situation of the content periodically provided by the content provider as the congestion information for the content. In this case, for example, the content provider terminal 50 periodically transmits the congestion situation to the server computer 30. The server computer 30 transmits the congestion situation received from the content provider terminal 50 to the digital signage device 10 in association with the content.

Alternatively, the digital signage device 10 may ask the content provider terminal 50 about the congestion situation. For example, when the waiting time has been acquired, the digital signage device 10 selects content in accordance with the waiting time and provides a notification for asking the content provider terminal 50 corresponding to each selected content item about the congestion situation. In response to the inquiry from the digital signage device 10, the content provider terminal 50 notifies the digital signage device 10 of the congestion situation of the content. The digital signage device 10 designates the congestion situation received from each content provider terminal 50 as congestion information for each content item.

Subsequently, the digital signage device 10 determines whether or not the content is congested on the basis of the congestion information of the content (step S204). For example, the digital signage device 10 determines that the content is congested when the congestion information indicates the congestion.

When it is determined that the content is congested, the digital signage device 10 sets the stay time in the content so that the stay time is longer in accordance with a congestion degree (step S205). For example, it is assumed that the congestion information indicates the congestion degree of the content in four levels, i.e., "smooth," "slightly congested," "congested," and "very congested." In this case, the digital signage device 10 lengthens the stay time by multiplying the stay time stored in the database by a coefficient of 1 or more according to any of the four levels. For example, when the congestion information indicates that the congestion degree of the content is "smooth," the coefficient is 1.0. Moreover, in the case of "slightly congested," the coefficient is 1.2. Moreover, in the case of "congested," the coefficient is 1.5. Moreover, in the case of "very congested," the coefficient is 1.8. That is, when the congestion degree indicated in the congestion information related to the content is greater than or equal to a threshold value, the digital signage device 10 changes the stay time in the candidate facility so that the stay time is longer than the reference stay time stored in the database. The threshold value here may be set arbitrarily.

Moreover, when it is determined that the content is congested, the digital signage device 10 displays a warning indicating that the content is congested together with the content (step S206).

On the other hand, when it is determined that the content is not congested in step S204, the digital signage device 10 ends the process.

In FIG. 11, a flow of a process of reflecting vacant seat information as surrounding environment information in the display of the content is shown. The vacant seat information is information indicating the current vacant seats in content related to a type of facility where a seat is occupied for use, such as a restaurant or a movie theater.

First, the digital signage device 10 acquires vacant seat information (step S300). The digital signage device 10, for example, acquires a vacant seat situation for content periodically provided by a content provider as the vacant seat information for the content. In this case, for example, the content provider terminal 50 periodically transmits the vacant seat situation to the server computer 30. The server computer 30 transmits the vacant seat situation received from the content provider terminal 50 to the digital signage device 10 in association with the content.

Alternatively, the digital signage device 10 may ask the content provider terminal 50 about the vacant seat situation. For example, when the waiting time has been acquired, the digital signage device 10 selects content in accordance with the waiting time and notifies the content provider terminal 50 corresponding to each selected content item of the vacant seat situation. In response to the inquiry from the digital signage device 10, the content provider terminal 50 notifies the digital signage device 10 of the vacant seat situation for the content. The digital signage device 10 designates the vacant seat situation received from each content provider terminal 50 as the vacant seat information for each content item.

Subsequently, the digital signage device 10 determines whether or not the content indicates that all seats are occupied on the basis of the vacant seat information of the content (step S301). For example, when the vacant seat information indicates that there are no vacant seats, the digital signage device 10 determines that the content indicates that all seats are occupied.

When it is determined that the content indicates that all seats are occupied, the digital signage device 10 sets the stay time in the content so that the stay time is longer or displays an unavailability message (an unavailability display) (step S302). For example, the digital signage device 10 lengthens the stay time by multiplying the stay time stored in the database by a coefficient of 1 or more (e.g., 2.0). Alternatively, the digital signage device 10 displays a warning indicating that all seats are occupied and the content cannot be used together with the content.

On the other hand, when it is determined that all seats are not occupied in step S301, the digital signage device 10 ends the process.

In addition, the flow in FIG. 11 may be configured so that the stay time changes on the basis of the vacant seat information acquired in step S300.

In this case, for example, the digital signage device 10 determines whether or not the facility corresponding to the content is vacant. Also, when it is determined that the facility is vacant, the digital signage device 10 shortens the stay time in the content in accordance with a vacancy degree. For example, it is assumed that the vacancy information indicates four levels, i.e., "full," "almost full," "some vacant seats," and "many vacant seats." In this case, the digital signage device 10 shortens the stay time by multiplying the stay time stored in the database by a coefficient less than 1 according to any of the four levels. For example, when the vacancy information indicates that the vacancy degree of the content is "full" or "almost full," the coefficient is 1.0. Moreover, when "some vacant seats" is indicated, the coefficient is 0.8. Moreover, when "many vacant seats" is indicated, the coefficient is 0.7. That is, when the vacancy degree indicated in the vacancy information related to the content is greater than or equal to a threshold value, the digital signage device 10 changes the stay time in the candidate facility so that the stay time is shorter than the reference stay time stored in the database. The threshold value here may be set arbitrarily. The threshold value set for the congestion information and the threshold value set for the vacant seat information may be the same value or different values.

As described above, the digital signage device 10 according to the present embodiment includes the content management unit 130 and the display processing unit 120. The content management unit 130 acquires a waiting time. The waiting time is the time during which the user waits to charge the battery (the in-vehicle battery) mounted on the electric vehicle 70. The content management unit 130 extracts candidate facilities available to the user according to the acquired waiting time. For example, the content management unit 130 extracts content in which a required time (a sum of a travel time and a stay time) is shorter than the waiting time as a candidate facility. The content management unit 130 acquires surrounding environment information. The surrounding environment information is information indicating the environment around the charging device 60 (a facility for charging the in-vehicle battery). The content management unit 130 selects at least one candidate facility from the candidate facilities according to the acquired surrounding environment information, and identifies the presentation content related to at least one selected candidate facility. The display processing unit 120 displays the presentation content identified by the content management unit 130.

Thereby, the digital signage device 10 of the embodiment can acquire the situation around the charging device 60 (a facility for charging the in-vehicle battery) and can select the presentation content to be presented to the user from the candidate facility according to the acquired surrounding environment information. Therefore, even if the situation of the facility changes from moment to moment, the content to be presented to the user can be selected in accordance with a change in the situation. In other words, it is possible to present the content in accordance with the change in the situation.

Moreover, in the digital signage device 10 according to the present embodiment, the content management unit 130 acquires weather information as surrounding environment information. The weather information is information indicating weather in an area around the charging device 60 (a facility for charging an in-vehicle battery). When the acquired weather information indicates bad weather, the content management unit 130 changes a travel time required to reach the candidate facility so that the travel time is longer than the reference travel time and identifies the presentation content in accordance with the changed travel time. The reference travel time is a standard travel time required to reach a candidate facility, and is, for example, information stored in a database. Thereby, the digital signage device 10 of the embodiment can change the travel time in accordance with the current weather and can select content to be presented to the user after considering that the movement to the content providing location is time-consuming due to the bad weather.

Moreover, the digital signage device 10 according to the present embodiment further includes a database. The database stores a reference stay time, which is a standard stay time at a candidate facility. When the acquired weather information indicates bad weather, the content management unit 130 changes a travel time required to reach the candidate facility so that the stay time is longer than the reference stay time stored in the database and identifies the presentation content in accordance with the changed travel time. Thereby, the digital signage device 10 of the embodiment can change the stay time in accordance with the current weather and can select content to be presented to the user after taking into consideration that bad weather will cause a long stay at the content providing location.

Moreover, in the digital signage device 10 according to the present embodiment, when the weather information indicates bad weather, the content management unit 130 changes priority order so that a facility to be used indoors among the candidate facilities has a higher priority than a facility to be used outdoors when the weather information indicates bad weather, and identifies the presentation content in accordance with the changed priority order. Thereby, the digital signage device 10 of the embodiment can change the priority order in accordance with the current weather and can select content to be presented to the user after considering that it is difficult to use a facility to be used outdoors due to bad weather.

Moreover, the digital signage device 10 according to the present embodiment acquires congestion information as surrounding environment information. The congestion information is information indicating the congestion degree in the candidate facility. The content management unit 130 makes a change so that the stay time in the candidate facility is longer than the reference stay time stored in the database in accordance with the congestion information and identifies presentation content in accordance with the stay time after the change. Thereby, the digital signage device 10 of the embodiment can consider that the stay time will be longer due to congestion in accordance with a current congestion situation of the content. For example, during congestion, it is assumed that it will take time to enter a store, the time required to provide a meal from ordering the meal in a facility such as a restaurant will be longer or it will take time to patrol a facility at the facility such as a museum. The content to be presented to the user can be selected after considering a situation during congestion. Moreover, it is possible to present information for users who want to avoid congestion from the viewpoint of infectious disease prevention measures and the like to select the content to be used by the user by acquiring a content congestion situation.

Moreover, in the digital signage device 10 according to the present embodiment, the content management unit 130 acquires vacant seat information as surrounding environment information. The vacant seat information is information indicating a vacancy degree in the candidate facility. In accordance with the vacant seat information, the content management unit 130 makes a change so that the stay time in the candidate facility is shorter than the reference stay time stored in the database and identifies the presentation content according to the stay time after the change. Thereby, in the digital signage device 10 according to the embodiment, it is possible to consider that the stay time will be longer due to waiting for a seat and the like in accordance with the vacant seat situation of the content at the current time. For example, it is assumed that the time required to provide a meal and the time required to patrol the facility are shorter during a non-congestion period than during a congestion period. The content to be presented to the user can be selected after considering a situation during this non-congestion period.

Moreover, in the digital signage device 10 according to the present embodiment, when the user has selected first content to be used during the waiting time from the presentation content displayed by the display processing unit 120, the content management unit 130 selects second content selected in accordance with the remaining waiting time (the remaining stay time obtained by subtracting the required time for the first content from the waiting time) as the presentation content. Thereby, the digital signage device 10 according to the embodiment can present a combination of a plurality of content items in accordance with the waiting time and allow the user to use the waiting time more effectively.

Moreover, the digital signage device 10 according to the present embodiment further includes a UI control unit 121. The UI control unit 121 acquires information indicating an attribute of content input in a manipulation process of the user and desired to be used by the user. The content management unit 130 selects a facility according to the attribute of the content acquired by the UI control unit 121 from the candidate facilities. The content management unit 130 sets the content related to the selected candidate facility as the presentation content. Thereby, the digital signage device 10 of the embodiment can present content according to the user's desire. Therefore, it is possible to display the content that is particularly desired by the user within content that can be used during the waiting time.

Figure 12:
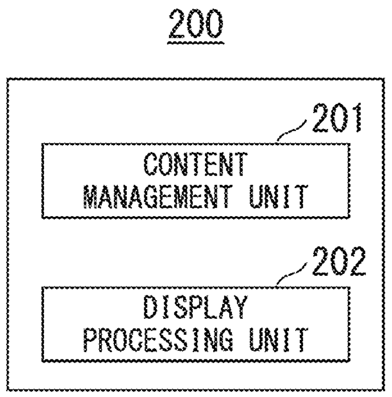
FIG. 12 A diagram showing a basic configuration of the content providing system according to the present invention.

FIG. 12 is a diagram showing a basic configuration of a digital signage device 200 according to the present invention. The basic configuration of the digital signage device 200 according to the present invention is a content management unit 201 and a display processing unit 202. The content management unit 201 acquires the waiting time. The waiting time is the time the user waits to charge the battery (the in-vehicle battery) installed in the electric vehicle 70. The content management unit 201 selects a candidate facility that the user can use in accordance with the acquired waiting time. The content management unit 201 acquires surrounding environment information. The surrounding environment information is information indicating the environment around the charging device 60 (a facility for charging the in-vehicle battery). The content management unit 201 selects content to be presented to the user from among the candidate facilities in accordance with the acquired surrounding environment information. The display processing unit 202 causes the presentation content selected by the content management unit 201 to be displayed.

Moreover, a program for implementing functions of the content providing system 1 and the digital signage device 10 in FIG. 1 is recorded on a computer-readable recording medium, and the program recorded on the recording medium may be read into a computer system and executed to perform a position detection process. In addition, the "computer system" used here is assumed to include an operating system (OS) or hardware such as peripheral devices.

Moreover, the "computer system" is assumed to include a homepage provision environment (or display environment) if a World Wide Web (WWW) system is used.

Moreover, the "computer-readable recording medium" refers to a flexible disk, a magneto-optical disc, a read-only memory (ROM), a portable medium such as a compact disc-ROM (CD-ROM), or a storage device such as a hard disk embedded in the computer system. Furthermore, the "computer-readable recording medium" is assumed to include a medium that holds a program for a certain period of time, such as a volatile memory inside a computer system serving as a server or a client. Moreover, the above-described program may be a program for implementing some of the above-described functions. Further, the above-described function may be implemented in combination with a program already recorded on the computer system. Moreover, the above-described program may be stored in a predetermined server and the program may be distributed (downloaded or the like) via a communication circuit in response to a request from another device.

Although embodiments of the present invention have been described in detail above with reference to the drawings, specific configurations are not limited to the embodiments and other designs and the like may also be included without departing from the scope and spirit of the present invention.

REFERENCE SIGNS LIST

1 Content providing system
10, 200 Digital signage device
11 Input unit
110 Input detection unit
111 Input information processing unit
12 Display unit
120, 202 Display processing unit
121 UI control unit
13 Data management unit
130, 201 Content management unit
131 Server data management unit
132 Charging data management unit
14 Communication unit
20 User terminal
30 Server computer
40 Server manager terminal
10 50 Content provider terminal
60 Charging device
70 Electric vehicle

What is claimed is:

1. A digital signage device comprising:
a memory that stores a set of processor-executable instructions; and
a hardware processor device configured to execute the set of processor-executable instructions to cause the hardware processor device to perform operations comprising:
acquiring a waiting time when a user waits to charge an in-vehicle battery;
extracting candidate facilities available to the user in accordance with the acquired waiting time;
acquiring surrounding environment information indicating an environment around a facility for charging the in-vehicle battery;
selecting at least one candidate facility from the candidate facilities in accordance with the acquired surrounding environment information;
acquiring weather information indicating weather of an area around the facility for charging the in-vehicle battery as the surrounding environment information,
changing priority order so that a facility to be used indoors among the candidate facilities has a higher priority than a facility to be used outdoors when the acquired weather information indicates bad weather, and
identifying presentation content in accordance with the priority order after the change; and
displaying the presentation content identified.

2. A digital signage device comprising:
a database storing a predetermined reference stay time that is a standard stay time in a candidate facility,
a memory that stores a set of processor-executable instructions; and
a hardware processor device configured to execute the set of processor-executable instructions to cause the hardware processor device to perform operations comprising:
acquiring a waiting time when a user waits to charge an in-vehicle battery;
extracting candidate facilities available to the user in accordance with the acquired waiting time;

acquiring surrounding environment information indicating an environment around the facility for charging the in-vehicle battery;

selecting at least one candidate facility from the candidate facilities in accordance with the acquired surrounding environment information;

acquiring congestion information indicating a congestion degree in the candidate facility as the surrounding environment information;

making a change to a changeable stay time so that the changeable stay time in the candidate facility is longer than the standard stay time stored in the database when the congestion degree indicated in the congestion information is greater than or equal to a threshold value; and identifying presentation content in accordance with the changeable stay time after the change.

3. The digital signage device according to claim 2, wherein the congestion degree indicated in the congestion information is determined by a same threshold value set as for a vacancy degree in the candidate facility.

4. A digital signage device comprising:

a memory that stores a set of processor-executable instructions; and a hardware processor device configured to execute the set of processor-executable instructions to cause the hardware processor device to perform operations comprising:

acquiring a waiting time when a user waits to charge an in-vehicle battery;

extracting candidate facilities available to the user in accordance with the acquired waiting time;

acquiring surrounding environment information indicating an environment around the facility for charging the in-vehicle battery;

selecting at least one candidate facility from the candidate facilities in accordance with the acquired surrounding environment information;

identifying presentation content related to the at least one candidate facility selected;

displaying the presentation content identified; and designating a second content selected in accordance with remaining stay time after a required time in first content is subtracted from the waiting time as the presentation content when the first content for use in the waiting time has been selected by the user from the presentation content displayed.

* * * * *